US007108919B2

(12) United States Patent
Shalati et al.

(10) Patent No.: US 7,108,919 B2
(45) Date of Patent: Sep. 19, 2006

(54) REACTIVE NON-ISOCYANATE COATING COMPOSITIONS

(76) Inventors: Mohamad Deeb Shalati, 9923 White Blossom Blvd., Louisville, KY (US) 40241; James Henry McBee, 1911 Lowell Ave., Louisville, KY (US) 40205; Ferry Ludovicus Thys, Tennislaan 16, St. Stevens-Woluwe (BE) 1932; William Jay DeGooyer, 8706 Wildon Pl., Louisville, KY (US) 40220

( * ) Notice: Subject to any disclaimer, the term of this patent is extended or adjusted under 35 U.S.C. 154(b) by 404 days.

(21) Appl. No.: 10/086,020

(22) Filed: Feb. 27, 2002

(65) Prior Publication Data
US 2002/0176994 A1    Nov. 28, 2002

Related U.S. Application Data

(60) Provisional application No. 60/271,861, filed on Feb. 27, 2001.

(51) Int. Cl.
*C09D 163/00* (2006.01)
*C09D 157/12* (2006.01)
*C09D 133/02* (2006.01)

(52) U.S. Cl. .................. 428/413; 525/108; 525/113; 525/117; 525/207; 525/208; 525/217; 524/501; 524/517

(58) Field of Classification Search ............... 525/207, 525/108, 113, 117, 123, 125, 127, 176, 187, 525/190, 406
See application file for complete search history.

(56) References Cited

U.S. PATENT DOCUMENTS

| | | | | |
|---|---|---|---|---|
| 3,000,848 A | 9/1961 | McGary, Jr. et al. | ......... | 260/42 |
| 3,431,237 A | 3/1969 | Harry | ........................... | 260/47 |
| 4,452,948 A | 6/1984 | Marrion et al. | .............. | 525/207 |
| 4,507,411 A | 3/1985 | Gordon et al. | ............... | 523/436 |
| 4,732,790 A | 3/1988 | Blackburn et al. | ........ | 427/407.1 |
| 4,732,791 A | 3/1988 | Blackburn et al. | ........ | 427/407.1 |
| 4,736,706 A | 4/1988 | Lang | ............................. | 119/1 |
| 4,755,581 A | 7/1988 | Blackburn et al. | ............. | 528/93 |
| 4,755,582 A | 7/1988 | Blackburn et al. | ............. | 528/93 |
| 4,798,745 A | 1/1989 | Martz et al. | .............. | 427/407.1 |
| 4,816,500 A | 3/1989 | Corcoran | ..................... | 523/400 |
| 4,826,921 A | 5/1989 | Andrews et al. | ............. | 525/102 |
| 4,871,806 A | 10/1989 | Shalati et al. | ................ | 525/108 |
| 4,946,744 A | 8/1990 | Shalati et al. | ................ | 428/500 |
| 5,034,464 A | 7/1991 | Arduengo | ................... | 525/207 |
| 5,043,220 A | 8/1991 | Shalati et al. | ................ | 428/413 |
| 5,057,555 A | 10/1991 | White et al. | ................. | 523/400 |
| 5,093,391 A | 3/1992 | Barsotti et al. | .............. | 523/400 |
| 5,214,104 A * | 5/1993 | Wamprecht et al. | ........ | 525/207 |
| 5,227,243 A | 7/1993 | Shalati et al. | ................ | 428/457 |
| 5,270,362 A | 12/1993 | Palmer | ......................... | 524/81 |
| 5,322,868 A | 6/1994 | Valet et al. | .................... | 524/89 |
| 5,376,706 A | 12/1994 | Barsotti et al. | .............. | 523/434 |
| 5,411,809 A | 5/1995 | Shalati et al. | ................ | 428/480 |
| 5,428,082 A | 6/1995 | Gould et al. | ................. | 523/400 |
| 5,516,846 A | 5/1996 | Shalati et al. | ................ | 525/207 |
| 5,578,418 A * | 11/1996 | Noguchi et al. | .......... | 430/280.1 |
| 5,580,926 A | 12/1996 | Shalati et al. | ................ | 525/108 |
| 5,602,274 A | 2/1997 | Gould et al. | ................. | 360/126 |
| 5,837,353 A | 11/1998 | Barsotti et al. | .............. | 428/204 |
| 6,146,703 A | 11/2000 | Barsotti et al. | ........... | 427/385.5 |
| 6,235,846 B1 | 5/2001 | Shalati et al. | ................ | 525/207 |

FOREIGN PATENT DOCUMENTS

| | | |
|---|---|---|
| EP | 134 691 A2 | 3/1985 |
| EP | 225 097 B1 | 6/1987 |
| EP | 257 512 B1 | 3/1988 |
| EP | 257 513 B1 | 3/1988 |
| EP | 257 513 B2 | 3/1988 |
| EP | 316 874 B1 | 5/1989 |
| EP | 551 989 A1 | 7/1993 |
| EP | 737 222 B1 | 10/1996 |
| EP | 770 103 B1 | 5/1997 |
| JP | 56-2315 | 1/1981 |
| JP | 56-92911 | 7/1981 |
| JP | 62-181319 | 8/1987 |
| JP | 8-120160 | 5/1996 |

OTHER PUBLICATIONS

International Search Report No. PCT/EP 02/02139, dated Sep. 23, 2002.
Derwent Abstract 17931 abstracting JP 56-2315.
Derwent Abstract 66855 abstracting JP 56-92911.
Derwent Abstract 87-260955/37 abstracting JP 62-181319.
Derwent Abstract 96-283653/29 abstracting JP 8-120160.
Derwent Abstract 94-300018/37, abstracting JP 06228503-A.
Proceedings Eurocoat 97, Sep. 23-25, Leo G.J. Van der Ven, René T.M. Leijzer, Egbert Brinkman and Paul Vandevoorde, Double Liaison, "Curing Mechanism and Film Properties of Waterborne Isocyanate-Free All-Acrylic Coatings", No. 498-499, pp. 549-560 (1997).
Leo G. J. van der Ven, René T. M. Leijzer, and Egbert Brinkman, "Dem Härtungsmechanisms auf der Spur", Farbe Lack, vol. 105, No. 8, pp. 24-29 (1999).

(Continued)

*Primary Examiner*—David J. Butter
(74) *Attorney, Agent, or Firm*—Howrey LLP

(57) ABSTRACT

Reactive, non-isocyanate coating compositions prepared by mixing epoxy, tertiary amine, anhydride, hydroxy- and, optionally, acid functional compounds, a system of making the coating composition, a method of coating the composition on a substrate and a substrate coated with the composition.

19 Claims, No Drawings

OTHER PUBLICATIONS

E. Brinkman and P. Vandevoorde, "Waterborne two-pack isocyanate-free systems for industrial coatings", Progress in Organic Coatings 34, pp. 21-25 (1998).

E. Manning and E. Brinkman, "All acrylic technology as an alternative to isocyanate-free polyurethane systems", Polymers Paint Colour Journal, vol. 190, No. 4426, pp. 21-23 (2000).

Richard Hall and Maarten Weber, "Waterborne All Acrylic (WBAA) Coatings in Transport and its Structures", Eurocoat, pp. 1-16 (2001).

Delano R. Eslinger, "High Solids Isocyanate Free Two Component Acrylic Coatings", Cook Composites and Polymers, pp. 108-118.

* cited by examiner

REACTIVE NON-ISOCYANATE COATING COMPOSITIONS

This application claims priority of U.S. Provisional Patent Application No. 60/271,861, filed Feb. 27, 2001.

The invention relates to reactive non-isocyanate coating compositions having mixtures of compounds containing 1) tertiary-amine, 2) anhydride, 3) epoxy, 4) hydroxy- and optionally 5) acid functionalities.

BACKGROUND OF THE INVENTION

Polymers that are used as binders in the preparation of coatings compositions usually require that a cross-linking reaction occurs after the application of the composition. This cross-linking reaction is necessary to obtain desired properties such as mechanical strength, resistance against chemical agents, exterior durability, etc. The cross-linking is often the result of the reaction between functional groups on the polymer and co-reactive functional groups on a cross-linker added to the composition. Examples are the reaction between the hydroxyl groups of a polymer and melamine-formaldehyde resins or between hydroxyl groups and polyisocyanate resins.

High performance, low temperature curing polyurethane or polyurea coatings include reactive polyisocyanates and active hydrogen-containing compounds such as hydroxyl-containing polymers or amine-containing polymers. Although these materials exhibit excellent performance and cure at low temperatures, the isocyanates may, under some conditions, be relatively hazardous to handle.

The coatings industry has been trying for years to develop non-isocyanate coating systems without sacrificing performance. Various non-isocyanate systems developed suffer from inferior performance in one or more areas such as durability, gloss retention, drying, hardness, solvent and humidity resistance and the like.

The market interest for non-isocyanate coatings is driven by environmental and safety concerns. Lower volatile organic compounds (VOC) and higher performance continue to be the driving forces for developing new and innovative coatings systems.

A non-isocyanate reactive coatings system, identified as the AA (All Acrylic) System, is available from Akzo Nobel Resins, a part of Akzo Nobel. This AA system is composed of two functional compounds: the first compound is a polymer containing epoxy and hydroxyl functionalities and the second compound is a polymer having tertiary amine and acid functionalities. The epoxy and tertiary-amine groups are the dominant functionalities in these polymers.

The first major cure reaction in AA is the reaction of t-amine with the epoxy group to form a quaternary ammonium ion with the aid of carboxylic acid:

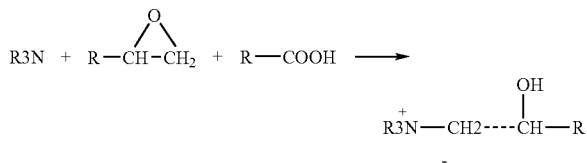

Once the acid groups are consumed by the formation of quaternary ammonium ions, other reactions take place to consume the excess epoxy groups. For a description of the chemistry of "all acrylic" coatings see Leo G. J. Van de Ven, Rene T. M. Lejzer, Egbert Brinkman, and Paul Vandevoorde, Double Liasion, "*Curing Mechanism of Waterborne Isocyanate Free All-Acrylic coatings*", No. 498–499, pp. 67–71 (1997); also see: Proceeding Eurocoat 97, September 23–25, pp. 549–560 (1997) and Farbe Lack, Vol. 105, No. 8, pp. 24–28 (1999),; E. Brinkman, and Paul Vandevoorde, "Waterborne two-pack isocynate-free systems for industrial coatings", Progress in Organic Coatings 34, pp. 21–25 (1998); E. Manning and E. Brinkman, "All acrylic technology as an alternative to isocyanate-free polyurethane systems, Polymers Paint Colour, J. Vol. 190, No. 4426, pp. 21–23, (2000); Richard Hall and Maarten Weber, "Waterborne All Acrylic (WBAA) Coatings in Transport and its Structure", Eurocoat, 2001, Lyon France.

The early hardness development (performance during the first few days), the ultimate flexibility, and solvent resistance of this system are unsatisfactory for applications in metal coatings, such as for small machinery, agricultural implements and construction equipment. Improved performance properties are desired. The present invention addresses these weaknesses.

Other non-isocyanate systems comprise various combinations of anhydride, hydroxyl, epoxy, and acid compounds. These formulations utilize tertiary-amine as a catalyst for the anhydride-hydroxyl reaction. The tertiary-amine catalyst does not contribute to the crosslinked structure of the film network. These systems have poor chemical resistance, hydrolytic instability and poor exterior durability.

The following patents are a few examples of the prior art where catalytic amounts of tertiary amines are used to catalyze the anhydride-hydroxyl reaction. U.S. Pat. No. 4,732,790 describes a process of coating where one of the compositions applied is a high solids coating based on hydroxy-functional epoxies and anhydride. U.S. Pat. No. 4,452,948 describes a two-pack coating system comprised of a hydroxyl component, an anhydride component and a catalyst. U.S. Pat. No. 4,871,806 refers to formulations of curable compositions comprising an acid-functional compound, an anhydride-functional compound, an epoxy-functional compound, and a hydroxy-functional compound. U.S. Pat. No. 5,227,243 refers to a substrate coated with a composition including a hydroxy-functional compound, an anhydride-functional compound and cycloaliphatic epoxy compound. U.S. Pat. Nos. 4,826,921, 4,946,744, and 4,798,745 refer to the formulation of compositions including anhydride and hydroxy-functional compounds. U.S. Pat. No. 5,602,274 refers to the use of non-cyclic anhydride with other coreactants such as, polyols, amines and epoxies. None of the prior art describe mixtures of compounds containing four (4) or five (5) functionalities in which a polymeric tertiary amine is used as co-reactant.

SUMMARY OF THE INVENTION

The invention relates to reactive, non-isocyanate coating compositions prepared by mixing epoxy, tertiary amine, anhydride, hydroxy- and, optionally, acid functional compounds, a method of coating the composition on a substrate and a substrate coated with the composition.

DETAILED DESCRIPTION OF THE INVENTION

The composition of the invention includes a mixture of compounds such that the following functional groups are present therein: 1) tertiary-amine, 2) anhydride, 3) epoxy, 4)

hydroxyl and optionally 5) acid. Each of these functionalities are co-reactants in the inventive composition. These functionalities can each be in individual compounds which are combined to form the composition or two or more of them can be present on a polymer. For example, there can be 3 separate compounds with each compound having one or more functionality, or 5 separate compounds, each having one of the functionalities.

The components of the coating composition of the present invention can be packaged separately to provide shelf-stability and mixed together prior to the coatings application. One or more functional-compound(s) can be packaged. As an example, the anhydride, the amine and the epoxy compounds can be packaged separately in three separate containers. According to this example, one of the components contains the hydroxyl, the acid and/or the amine functionalities which can be packaged together as a mixture of two or three separate compounds or as one copolymer containing all the three functionalities on the same copolymer. One of the other components includes the epoxy and optionally the hydroxyl functionalities which can be packaged together as a mixture of two compounds each having a single functionality or as a single copolymer having two functionalities. Another component or package includes the anhydride functionality which can be packaged by itself or with the acid functionality as a single copolymer having the two functionalities or as a physical blend of two separate compounds. Due to its reactivity, the system has a limited pot-life (which is the useable time in which the composition can be applied) and should be used within the useful pot-life.

The tertiary-amine, epoxy and hydroxyl functional group-containing compounds are polymers or oligomers with two or more, preferably three or more, functional groups in the molecule. Such multifunctional molecules are needed as a film former and to enable the formation of a polymeric, 3-dimensional network. The anhydride and acid functional group-containing compounds can be monomeric and/or polymeric with one or more functional groups in the molecule. Preferably, the anhydride functional group-containing compound is polymeric. The hydroxyl functionality can be introduced to the reactive system as part of the epoxy, tertiary amine and/or the acid4functional group-containing compounds and/or as separate hydroxyl-functional polymers. Similarly, the acid functionality can be introduced as part of the anhydride, tertiary-amine and/or the hydroxyl compounds and/or as separate acid-functional compounds. The reactive non-isocyanate coating compositions of the present invention provide high performance and low VOC industrial coatings with superior performance and excellent durability. These coatings are especially useful for finishing metal, plastic and wood articles.

More than one functionality can exist on the backbone of the same polymer, oligomer, or low molecular weight compound. Additionally, more than one functionality can be present in a component or package. The following combinations are disclosed by way of non-limiting examples:
Epoxy & Hydroxyl
Hydroxyl & acid
Hydroxyl & amine
Acid & amine
Anhydride & acid
Acid, amine & hydroxyl The coating compositions of the present invention have a solvent system as a carrier. This carrier can be either water or organic solvent. The solvent can be a separate component or package, or it can be packaged together with one of the other components. Stable water-borne or solvent-borne anhydride-, hydroxy-, epoxy-, amine- and, optionally, acid-functional compounds can be made and used in the present invention. If the composition is waterborne, emulsion polymerization of the monomers in the presence of a surface-active material and an initiator that generates free radicals in water is a convenient preparation method. Alternatively, the copolymer can be prepared in an organic solution and subsequently emulsified in water.

Anhydride containing coatings systems are known for their fast early cure properties, but their overall properties are poor. It would not be thought desirable to add an anhydride to the reactive non-isocyanate coating composition of the present invention, since one would think that the polymeric amine and polymeric anhydride would gel, forming a salt and making application, such as spraying, difficult. Additionally, it would be difficult to think of preparing and using anhydride-functional polymer in water due to the known instability of anhydride in aqueous medium. However, the current invention clearly demonstrates that a fraction of the anhydride compound, monomer and/or polymer, can be hydrolyzed, neutralized with a base, and used as an ionic surfactant to self-emulsify the remainder of the anhydride compound. The hydrolyzed and neutralized fraction of the anhydride constitutes the shell of the dispersed particle while the core contains the intact anhydride groups.

Conventional emulsification and dispersing approaches can be used to prepare the waterborne compounds used in the present invention. These include the use of ionic and non-ionic surfactants in the emulsion polymerization of acrylic monomers containing epoxy and/or hydroxy-functional groups. Acid-functional acrylic monomers such as 2-acrylamido, 2-methylpropane sulphonic acid and methoxypolyethyelenglycol methacrylate can be used to render water dispersability for the anhydride and amine polymers.

The polymeric tertiary amine functions as a co-reactant in the inventive reactive non-isocyanate coating compositions, in addition to its catalytic function for the anhydride-hydroxyl reaction. The reactive system containing hydroxyl, anhydride, t-amine, epoxy, and, optionally, acid groups give superior coatings properties compared to the previously known non-isocyanate coatings systems. The anhydride and polymeric hydroxyl react to form a hard initial network which contributes to initial hardness and ultimate solvent resistance. The tertiary amine functionality reacts with the epoxy functionality and/or acid functionality to generate quaternary ammonium and/or ammonium ions where ionic cross-links are formed in addition to the covalent ester cross-links generated from the acid/epoxy reaction. The ionic cross-links allow for the delocalization of the lone pairs of electrons on the nitrogen atoms to give stable and durable network systems.

The equivalent ratios of various components that can be employed in the present invention are described in reference to the tertiary amine functionality: for every one mole of tertiary amine used, there will be about 0.3 to about 75 moles of epoxy groups, about 0.05 to about 50 moles of anhydride groups, about 0.05 to about 50 moles of hydroxyl groups, and about 0.0 to about 10 moles of carboxyl groups. However, the preferred compositions include about 0.75 to about 10 moles of epoxy, about 0.1 to about 7 mole of anhydride groups, about 0.05 to about 7 moles of hydroxyl groups, and about 0.0 to about 1 mole of carboxyl for every one mole of tertiary amine. Yet more preferred compositions of the present invention include about 0.75 to about 5 moles of epoxy, about 0.1 to about 3 mole of anhydride groups, about 0.1 to about 3 moles of hydroxyl groups, and about 0.0 to about 0.2 mole of carboxyl for every one mole of tertiary amine.

In certain compositions of the more preferred compositions where ambient or low bake conditions are used, the epoxy and amine constitute the major components of the reactive non-isocyanate coating composition, while the anhydride, hydroxyl, and optional acid are the minor components. For example, the molar ratio of the epoxy, amine, anhydride, hydroxyl and optionally carboxyl functionalities can be 1.4/1/0.4–0.8/0.4–0.8/0.0–0.2, respectively.

However, higher amounts of the anhydride, hydroxyl and optional acid can be practiced according to the present invention with great success in certain applications, especially at higher bake end-use applications. For this application, the molar ratio of the epoxy, amine, anhydride, hydroxyl and optionally carboxyl functionalities can be, for example, 75/1/50/50/0.0–0.2, respectively.

The tertiary amine compound is a polymer which preferably has at least two or more tertiary amine groups per molecule. The average tertiary-amine equivalent weight can range, for example, from about 50 to about 3000. The anhydride compound is a cyclic anhydride of di-carboxylic acids which can be a monomer and/or a polymer with two or more anhydride functionalities per molecule. The average anhydride equivalent weight can be, for example, as low as about 100 or as high as about 2000. The hydroxyl compound is a polymer with at least two or more functional groups per molecule. The average hydroxyl equivalent weight can be, for example, as low as about 31 or as high as about 2000.

The compositions of the present invention can include any polymeric tertiary amine regardless of the backbone. Various backbone polymers include polyesters, polyethers, acrylics, polyurethanes, or hydrocarbon type polymers. One method for the preparation of the acrylic polymeric tertiary amines is based on polymerizing an ethylenically unsaturated mono-tertiary-amine monomer with one or more other ethylenically unsaturated monomer(s) copolymerizable with the ethylenically unsaturated mono-tertiary-amine monomer. Examples of the ethylenically unsaturated mono-tertiary-amine monomer include dimethylaminoethyl methacrylate or acrylate, diethylaminoethyl methacrylate or acrylate, dialkylaminoalkyl methacyamide or acrylamide. Examples of the ethylenically unsaturated monomer(s) copolymerizable with the ethylenically unsaturated mono-tertiary-amine monomer include non-functional and optionally functional ethylenically unsaturated monomers. Examples of the non-functional ethylenically unsaturated monomers include styrene, alpha-methyl styrene, alkyl acrylate and/or methacrylate having 1–18 carbons where the alkyl group is a linear or branched alkyl radical such as methyl, ethyl, propyl, butyl, pentyl, hexyl, heptyl, octyl, dodecyl, 2-ethylhexyl, cyclohexyl, etc. The functional monomers include acid-functional monomers and/or hydroxy-functional monomers. These acid and hydroxy-functional monomers are described under the corresponding sections of functional compounds.

Other types of tertiary-amine functional polymers are those described below for the preparation of hydroxy-functional compounds from secondary amines and epoxides to produce hydroxy—and tertiary amine functional polymers. The tertiary amine polymer is a co-reactant as well as a catalyst, so it contributes to the crosslinked structure of the film network. The contribution of the tertiary amine polymer to the network structure has not heretofore been the case in the presence of anhydride. The tertiary amine polymer has a major impact on the overall crosslinking and 3-dimensional network formation as it forms polymeric salt and quaternary ammonium ions. It may be present at a level higher than a catalytic amount (higher than 0.5%). The polymer reacts in more than one site which results in multiple crosslinks. Generally, the polymeric tertiary amine is present at 0.5–60 mole % and preferably above the 3 mole % level.

The hydroxyl group-containing compound can be polymeric, e.g. hydroxy-functional polymer, such as hydroxyl group-containing acrylic or polyester resin. Alternatively, the hydroxyl group-containing compound can be incorporated into the epoxy, the acid or the amine polymers. Similarly, the acid groups can be introduced to the system as an acid-functional polymer (or monomer) or it can be incorporated along the backbone of the anhydride (monomer and/or polymer), the amine, and/or or the hydroxyl polymers.

The hydroxy-functional compound can include, by way of non-limiting example, polyurethane polyols which are the reaction products of alcohols and isocyanate and are described in U.S. Pat. Nos. 5,130,405 and 5,175,227, both of which are hereby incorporated by reference. Other hydroxy-functional compounds include polyester polyols which are derived from the condensation of polycarboxylic acids and/or anhydrides and polyols. Specific examples of polycarboxylic acids include maleic, succinic, phthalic, adipic, trimellitic, cyclohexanedicarboxylic acids and/or anhydrides. Selected examples of polyols which can react with the carboxylic acids and/or the anhydride to form the polyester polyols include ethylene glycol, propylene glycol, butylene glycol, diethylene glycol, dipropylene glycol, 1-3, propane diol, 1-4 butanediol, 1-5 pentanediol, 1,6-hexanediol, 1-4 cyclohexanedimethanol, neopentyl glycol, 2,2, 4-trimethyl 1,3 pentanediol, 2,2-butyl, ethyl 1-3 propanediol, 2,2 bis(4-hydroxycyclohexyl)propane, bis(4-hydroxycyclohexyl)methane, trimethylolethane, trimethylolpropane, glycerol, pentaerythritol, dipentaerythritol, sorbitol, etc. Monoalcohol and/or monoacids may be used in the preparation of these polyesterpolyols as a modifier or co-reactant. The reaction between acids/anhydride and polyols is usually conducted under condensation polymerization conditions where water is removed azeotropically to the desired molecular weight, hydroxy and acid values. Certain polyols can be modified with carprolactone to impart molecular weight extension, flexibility and reactivity.

Other hydroxy-functional compounds include polyether polyols which are known in the art and can be prepared, for example, by reacting a diol, a triol or a polyol with alkylene oxide. Representative examples include polyethylene glycol and polypropylene glycols. Another class of hydroxy-functional compounds includes the reaction products of monomeric and or polymeric amines and epoxides. The amines are secondary ones having the following general structure:

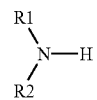

where R1 & R2=
1) C1 to C18 alkyl/aryl radical-linear or branched, cyclic and/or acylic, aliphatic and/or aromatic, saturated and/or unsaturated 2) C1 to C18 hydroxyalkyl/aryl radical having linear or branched, cylic and/or acylic, aliphatic and/or aromatic, saturated and/or unsaturated
3) Combination of 1) & 2)
4) 1) and/or 2) having non-reactive substituents such as CN, OR, OOCR, Cl, F, Br, I, NO2, amide, carbamate etc . . . , Representative examples of the amine include diethanol amine, N-methylethanol amine, dimethyl amine, dibutyl amine, benzylmethyl amine, substituted and unsubstituted piperidine and pipirazine, etc. Representative examples of the epoxides used as a co-reactant with the secondary amines include ethylene oxide, propylene oxide, acrylic co-polymers of glycidyl acrylate and/or methacrylate with styrene and acrylic or methacrylic monomers, and the reaction products of epichlorohydrin with polyhydric alcohol or phenol such as those known as bisphenol-A or F based epoxides. These commercially available epoxides are known as Epon, DER or Araldite from Resolution Performance Products, Dow Chemical Co. or Ciba-Geigy Corp. respectively. Other epoxides useful as co-reactants with the secondary amines to produce the hydroxy-functional compounds are those described in the following section which details the teaching of the epoxides useful in this invention.

Other useful hydroxy-functional compounds include acrylic and styrene copolymers with hydroxy-functional monomers. These hydroxy-functional compounds are conveniently prepared by copolymerizing under a free-radical polymerization condition a mixture of ethylenically unsaturated monomers comprising a) 5–70 mole % hydroxy-functional monomers, b) 0–50 mole % styrene, c) 5–95 mole % alkyl acrylate and/or methacrylate, and d) 0–50 mole % carboxyl, epoxy and/or tertiary amine functional compounds. Examples of hydroxy-functional monomers include hydroxyethyl acrylate, hydroxyethyl methacrylate, hydroxypropyl acrylate, hydroxypropyl methacrylate, 4-hydroxybutyl acrylate, 4-hydroxy butyl methacrylate, various caprolactone-modified hydroxy-functional monomers available from Dow Chemicals under the trade name Tone Monomers or from Daicel Chemical Industries under the trade name Placcel, reaction product of acrylic acid or methacrylic acid with Cardura E-10 from Shell Chemicals and the like. Examples of the alkyl acrylate or methacrylate include non-functional acrylate and methacrylate having 1–18 carbons where the alkyl group is a linear or branched alkyl radical such as methyl, ethyl, propyl, butyl, pentyl, hexyl, heptyl, octyl, dodecyl, 2-ethylhexyl, cyclohexyl, etc.

Other representative examples of hydroxy-functional compounds include the reaction products of epoxy-functional polymers and saturated fatty carboxylic acid such as isonanoic acid, the reaction products of acid-functional polymers with epoxy-functional compounds such as Cardura E-10 from Shell Chemicals.

Non-limiting examples of epoxy-functional compounds include aromatic and aliphatic epoxides. The preferred epoxy-functional compounds are aliphatic and cycloaliphatic epoxy for durability purposes. These include compounds having two or more epoxy groups such as those based on glycidyl ethers, esters, acrylic polymers, urethane (such as, for example, urethane from isocyanates and glycidyl alcohol), epoxidized oils; cycloaliphatic epoxies or a mixture thereof. Specific non-limiting examples include acrylic polymers obtained by the free-radical polymerization of glycidyl acrylate or methacrylate monomers with other free-radically copolymerizable monomers, such as styrene, alkyl (meth)acrylate, hydroxyethyl (meth)acrylate, and any other co-polymerizable monomers. Non-limiting examples also include polyglycidyl ether of polyols such as trimethylol ethane or propane, pentaerythritol, neopentyl glycol, and the like (having 2 or more epoxy groups); 3,4-epoxy cyclohexylmethyl and/or 3,4-epoxycyclohexane carboxylate. Additional non-limiting examples include tri 3,4-epoxycyclohexane carboxylate esters of trimethylol ethane or propane or tetra 3,4-epoxycyclohexane carboxylate ester of pentaerythrytol; also see examples described in U.S. Pat. No. 6,201,070, which is hereby incorporated by reference; sorbitol polyglycidyl ether known as DENACOL™ from Nagase America Corporation, and mixtures thereof. Preferably, the epoxy functional compound is a cycloaliphatic epoxide and/or an acrylic copolymer made by the free-radical polymerization of styrene, alkyl acrylate and methacylate with hydroxyethyl methacrylate and/or acrylate and glycidyl methacrylate and/or acrylate.

The preferred anhydrides are monoanhydride and/or anhydride-functional polymers based on polymerizing an ethylenically unsaturated monoanhydride monomer with one or more other ethylenically unsaturated monomer(s) copolymerizable with the ethylenically unsaturated monoanhydride monomer. Non-limiting examples of ethylenically unsaturated monoanhydride monomer include: itaconic anhydride, maleic anhydride, alkenyl succinic anhydride such as allyl succinic anhydride, ethyl-butenylsuccinic anhydride and the like. Non-limiting examples of copolymerizable ethylenically unsaturated monomers include styrene, alkyl (meth)acrylate where the alkyl group contains from 1–18 carbon atoms, and/or alpha olefin monomers including 1-alkenes such as 1-pentene, 1-hexene, 1-heptene, 1-octene, etc.

Representative examples of monoanhydrides in the composition include phthalic anhydride, tetra- and hexahydrophthalic anhydride, 4-methylhexahydrophthalic anhydride, 3,6-endomethylene-4-tetrahydrophthalic anhydride, methyl-3,6-endomethylene-tetrahydrophthalic anhydride (methylnadic anhydride), 3,4,5,6,7,7-hexachloro-3,6-endomethylene-tetrahydophthalic anhydride, succinic anhydride, butenylsuccinic anhydride, dodecenyl-succinic anhydride; pyromellitic dianhydride or mixtures of such anhydrides.

The anhydride-functional polymer can alternatively be an ene-adduct of an unsaturated anhydride such as maleic anhydride to a diene polymer such as unsaturated oil, drying alkyds, polyester or unstaurated polymers such as butadiene polymers and copolymers and the metathesis polymers of cyclooctene.

The presence of the acid/carboxyl-functional compound is optional. This acid can be a mono-functional compound, such as acetic acid, and/or higher molecular weight acids and fatty acids or a poly-functional compound. Polymeric acids include, by way of non-limiting example, (meth) acrylate, polyesters, polyester urethanes and the like. Representative examples of the polymeric acrylic acids include copolymers of ethylenically unsaturated organic acids with ethylenically unsaturated monomers copolymerizable with the ethylenically unsaturated organic acids. Representative examples of ethylenically unsaturated organic acids include acrylic acid, methacrylic acid, crotonoic acid, tiglic acid, 3,3-dimethylacrylic acid, trans-2-pentenoic acid, 4-pentenoic acid, trans-2-methyl-2-pentenoic acid, 6-heptenoic acid, 2-octenoic acid, and the like. Preferred unsaturated organic acids include acrylic acid, methacrylic acid, and mixtures thereof where the average acid equivalent weight is, for example, at least 46. Representative examples of the mono-functional acid include acetic acid, propanoic acid, butanoic acid, pentanoic acid, hexanoic acid, heptanoic acid, octanoic acid, nonanoic acid, isonanoic acid, dodecanoic acid, palmetic acid, strearic acid, isostearic acid, mixtures thereof and the like.

The coating composition can be applied in any known manner, for example by brushing, spraying, dipping, roll coatings, flow coatings or any other method employed for applying coatings. It is then dried at ambient or bake conditions. Possible chemical reactions that can take place during the cure time are shown below:

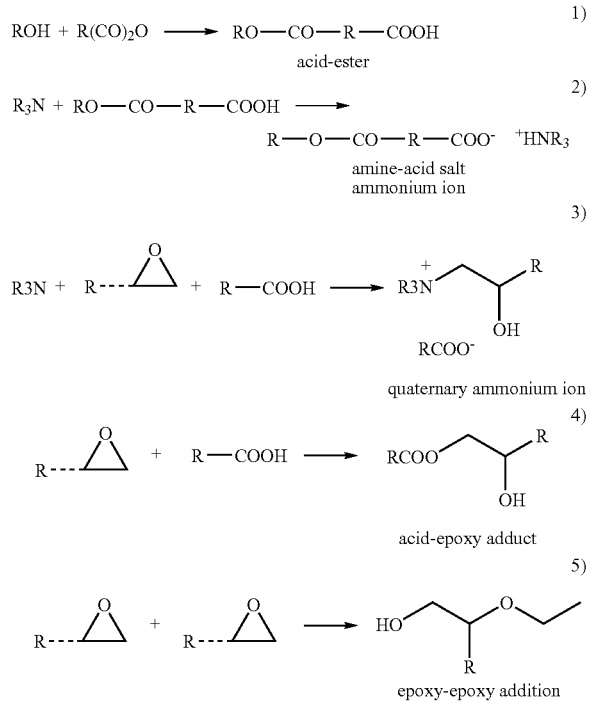

Reaction 1 is the fastest reaction leading to a permanent crosslinking if the anhydride and hydroxyl are in polymeric forms. It is catalyzed by the presence of the tertiary amine polymer which also substantially contributes to the three dimensional network. If only the anhydride functional compound is monomeric, then the hydroxyl groups are converted to acid groups, which will react further with the epoxy and amine. Reaction 1 also provides the desirable early hardness development. Reaction 2 proceeds immediately after the completion of Reaction 1. Reaction 3 proceeds at a slower rate than Reaction 1 and provides additional cross-links, thus enhancing the overall cure of the system. However, its contribution to the network is substantial at higher levels of the amines. It is more pronounced when the epoxy compound is a glycidyl type. When the epoxy compound is an aliphatic or cycloaliphatic epoxy, Reaction 4 is the dominant reaction and requires higher reaction temperatures. Several other reactions are possible.

The coatings of the present invention may typically be applied to any substrate such as metal, plastic, glass, wood, synthetic fibers, various synthetic composites, etc. by brushing, spraying, dipping, roll coatings, flow coatings or any other method employed for applying coatings. The applied coatings are allowed to cure at ambient temperatures or baked at anywhere from about 120 F to about 400 F, such as from about 150 F to about 200 F, for about 20–40 minutes or 250 F to 350 F for about 15–20 minutes. The time and temperature depend upon the type of substrate, its thermal stability, the method of heat or energy transfer and the efficiency of that transfer.

By way of example, the coating composition of the present invention has a solids content of about 20–80% by weight binder and 80–20% by weight water and/or organic solvent(s).

The coatings of the present invention may typically be used as primers, undercoats, basecoats, clearcoats, and/or topcoats. Among the preferred applications of the present invention are: 1) Clearcoat/Basecoat for automotive coatings formulations; 2) Topcoat for general industrial metal coatings formulations; 3) Primers, sealers, clearcoat and basecoats for wood coatings formulations; and 4) Primers and topcoats for plastic coatings formulations.

The present invention has been demonstrated to give superior coatings properties compared to the previously known systems. This is shown by the following examples which represent several embodiments of the composition, preparation, and performance advantages of the present invention. and are not intended to limit the scope of the invention. All parts are by weight unless otherwise specified.

Examples 1–17 are examples of the preparation of polymers useful in the composition of the present invention.

EXAMPLE 1

Preparation of Anhydride-Functional Acrylic Polymer

To a five liter, four neck reaction flask equipped with a Dean-Stark trap, condenser, agitator, heating mantle, FMI liquid metering pumps and thermocouple attached to an L11-1500 Thermowatch, 1440.18 parts of aromatic 100 was charged and heated to a reflux temperature of 325° F. A pre-mixture of 802.4 parts of butyl methacrylate, 802.4 parts of styrene, 802.4 parts of butyl acrylate, 267.5 parts of maleic anhydride and 40.12 parts of tert-butyl peroxybenzoate were added over 3 hours via an FMI QG50 monomer pump. The temperature was held at the reflux point of aromatic 100 throughout the monomer addition. The reaction mixture was then held for 1 hour to allow for completion of the polymerization reaction. A small amount of chaser initiator, 2.16 parts of tert-butyl peroxybenzoate, were then added and the reaction mixture was held for an additional hour at reflux. The reaction mixture was then cooled and thinned with a mixture of 51.29 parts of aromatic 100 and 291.61 parts of methyl amyl ketone (MAK). The thinned resin solution was then discharged and filtered. The Gardner Holdt viscosity at the corresponding % solids of the resultant resin was N–O at 60.3% solids and A1–A at 50% solids in MAK. The weight average molecular weight was 4450.

EXAMPLE 2

Preparation of Anhydride-Functional Acrylic Polymer

A five-liter reaction vessel equipped similarly to that used in Example 1 was charged with 1440.18 parts of aromatic 100 and heated to its reflux temperature of 325° F. A pre-mixture of 668.66 parts of methyl methacrylate, 668.66 parts of styrene, 668.66 parts of butyl acrylate, 668.66 parts of maleic anhydride and 40.12 parts of tert-butyl peroxybenzoate was added over 3 hours via an FMI QG50 monomer pump. The temperature was held at the reflux point of aromatic 100 throughout the monomer addition. The reaction mixture was then held 1 hour to allow for completion of the polymerization reaction. A small amount of chaser initiator, 2.16 parts of tert-butyl peroxybenzoate, was then added and the reaction mixture was held for an additional hour at reflux. The reaction mixture was then cooled and thinned with a mixture of 51.29 parts of aromatic 100 and 291.61 parts of methyl amyl ketone. The thinned resin solution was then discharged and filtered. The Gardner Holdt viscosity at the corresponding % solids of the resultant resin was: Z5-Z6 at 59.4% solids and J–K at 50% solids in MAK. The weight average molecular weight was 3900.

EXAMPLE 3

Preparation of Anhydride-acid Functional Acrylic Polymer

A five-liter reaction vessel equipped similarly to that used in Example 1 was charged with 1440.18 parts of aromatic 100 and heated to its reflux temperature of 325° F. A pre-mixture of 588.87 parts of methyl methacrylate, 588.87 parts of styrene, 588.87 parts of butyl acrylate, 668.66 parts of maleic anhydride, 239.38 parts acrylic acid and 40.12 parts of tert-butyl peroxybenzoate was added over 3 hours via an FMI QG50 monomer pump. The temperature was held at the reflux point of aromatic 100 throughout the monomer addition. The reaction mixture was held 1 hour after the monomer addition was complete to allow for completion of the polymerization reaction. A small amount of chaser initiator, 2.16 parts of tert-butyl peroxybenzoate, was then added and the reaction mixture was held for an additional hour at reflux. The reaction mixture was then cooled, thinned with 342.90 parts of aromatic 100 and 405.27 parts of methyl amyl ketone and then filtered. The Gardner Holdt viscosity at the corresponding % solids of the resultant resin was: Z4–Z5 at 59.4% solids and U-V at 50% solids in MAK. The weight average molecular weight was 3600.

EXAMPLE 4

Preparation of Anhydride-Functional Acrylic Polymer

A three-liter reaction vessel equipped similarly to that used in Example 1 was charged with 800.49 parts of aromatic 100 and heated to its reflux temperature of 325° F. A pre-mixture of 371.66 parts of methyl methacrylate, 371.66 parts of styrene, 371.66 parts of butyl acrylate, 371.66 parts of maleic anhydride and 22.30 parts of tert-butyl peroxybenzoate was added over 3 hours via an FMI QG50 monomer pump. The temperature was held at the reflux point of aromatic 100 throughout the monomer addition. The reaction mixture was then held 1 hour to allow for completion of the polymerization reaction. A small amount of chaser initiator, 1.20 parts of tert-butyl peroxybenzoate, was then added and the reaction mixture was held for an additional hour at reflux. The reaction mixture was then cooled and thinned with a mixture of 190.59 parts of methyl amyl ketone. The thinned resin solution was then discharged and filtered. The Gardner Holdt viscosity at the corresponding % solids of the resultant resin was: Z4–Z5 at 59.7% solids and J–K at 50% solids in MAK. The weight average molecular weight was 5400.

EXAMPLE 5

Preparation of Anhydride-Functional Acrylic Polymer

A five-liter reaction vessel equipped similarly to that used in Example 1 was charged with 1440.18 parts of aromatic 100 and 401.18 parts of maleic anhydride and heated to its reflux temperature of 325° F. A pre-mixture of 802.4 parts of butyl acrylate, 802.4 parts of styrene, 668.63 parts of maleic anhydride and 40.12 parts of tert-butyl peroxybenzoate was added over 3 hours via an FMI QG50 monomer pump. The temperature was held at the reflux point of aromatic 100 throughout the monomer addition. The reaction mixture was then held at the reflux point of aromatic 100 for 1 hour to allow for completion of the polymerization reaction. A small amount of chaser initiator, 2.16 parts of tert-butyl peroxybenzoate, was then added and the reaction mixture was held for an additional hour at reflux to complete the polymerization. A second 2.16 parts of tert-butyl peroxybenzoate was then added and held for another hour to complete the polymerization. The reaction mixture was then cooled and thinned with 342.90 parts of methyl amyl ketone. The thinned resin solution was then discharged and filtered. The Gardner Holdt viscosity at the corresponding % solids of the resultant resin was Z3 at 60.4% solids and D-E at 50% solids in MAK. The weight average molecular weight was 2400.

EXAMPLE 6

Preparation of Epoxy-Functional Acrylic Polymer

A five-liter reaction vessel equipped similarly to that used in Example 1 was charged with 1499.18 parts of butyl acetate and heated to 260–270° F. A pre-mixture of 823.55 parts of styrene, 880.32 parts of butyl acrylate, 207.33 parts butyl methacrylate, 636.02 parts of glycidyl methacrylate and 254.84 parts of tert-butyl peroxy-3,5,5-trimethylhexanoate was added over 3 hours through an FMI QG50 monomer pump. The reaction mixture was held at 260–270° F. throughout the monomer addition. The reaction mixture was then held at 260–270° F. for 1 hour to allow for completion of the polymerization reaction. The mixture was then cooled, thinned with 198.76 parts of butyl acetate and filtered. The Gardner Holdt viscosity at the corresponding % solids of the resultant resin was: F at 60.6% solids, and $A_2$–$A_1$ at 50% solids in n-butyl acetate. The weight average molecular weight was 6300.

EXAMPLE 7

Preparation of Epoxy-Functional Acrylic Polymer

A five-liter reaction vessel equipped similarly to that used in Example 1 was charged with 1499.18 parts of butyl acetate and heated to 260–270° F. A pre-mixture of 636.75 parts of styrene, 636.75 parts of butyl acrylate, 509.44 parts butyl methacrylate, 764.17 parts of glycidyl methacrylate and 254.84 parts of tert-butyl peroxy-3,5,5-trimethylhexanoate was added over 3 hours through an FMI QG50 monomer pump. The temperature was held at 260–270° F. throughout the monomer addition. The reaction mixture was then held at 260–270° F. for 1 hour to allow for completion of the polymerization reaction. The mixture was then cooled, thinned with 198.76 parts of butyl acetate and filtered. The Gardner Holdt viscosity at the corresponding % solids of the resultant resin was H–I at 60.5% solids and A1–A at 50% solids in butyl acetate. The weight average molecular weight was 7050.

EXAMPLE 8

Preparation of Epoxy and Hydroxy-Functional Acrylic Polymer

A three-liter reaction vessel equipped similarly to that used in Example 1 was charged with 766.35 parts methyl amyl ketone and heated to 260–270° F. A pre-mixture of 390.6 parts styrene, 390.6 parts butyl acrylate, 130.2 parts 2-hydroxyethyl methacrylate, 390.6 parts glycidyl methacrylate and 130.27 parts tert-butyl peroxy-3,5,5-trimethylhexanoate was added over 3 hours through a monomer pump. The temperature was held at 260–270° F. throughout the monomer addition. The reaction mixture was then held at 260–270° F. for 1 hour after the monomer addition to allow for completion of the polymerization reaction. At this point the mixture was cooled, thinned with 101.60 parts of methyl amyl ketone and then filtered. The Gardner Holdt viscosity at the corresponding % solids of the resultant resin was H–I at 60.5% solids and A1–A at 50% solids in MAK. The weight average molecular weight was 4700.

EXAMPLE 9

Preparation of Epoxy and Hydroxy-Functional Acrylic Polymer

A three-liter reaction vessel equipped similarly to that used in Example 1 was charged with 766.35 parts n-butyl acetate and heated to 255–265° F. A pre-mixture of 420.98 parts styrene, 450.00 parts butyl acrylate, 105.98 parts 2-hydroxyethyl methacrylate, 325.12 parts glycidyl methacrylate and 130.27 parts tert-butyl peroxy-3,5,5-trimethylhexanoate was added over 3 hours through a monomer pump. The temperature was held at 255–265° F. throughout the monomer addition. The reaction mixture was then held at 255–265° F. for 1 hour after the monomer addition to allow for completion of the polymerization reaction. At this point the mixture was cooled, thinned with 101.60 parts of n-butyl acetate and then filtered. The Gardner Holdt viscosity of the resultant resin was H–J at 60% solids in n-butyl acetate.

EXAMPLE 10

Preparation of Epoxy and Hydroxy-Functional Acrylic Polymer

A three-liter reaction vessel equipped similarly to that used in Example 1 was charged with 766.35 parts methyl amyl ketone and heated to 260–270° F. A pre-mixture of 420.98 parts styrene, 450.00 parts butyl acrylate, 105.98 parts 2-hydroxyethyl methacrylate, 325.12 parts glycidyl methacrylate and 130.27 parts tert-butyl peroxy-3,5,5-trimethylhexanoate was added over 3 hours through a monomer pump. The temperature was held at 260–270° F. throughout the monomer addition. The reaction mixture was then held at 260–270° F. for 1 hour after the monomer addition to allow for completion of the polymerization reaction. At this point the mixture was cooled, thinned with 101.60 parts of methyl amyl ketone and then filtered. The Gardner Holdt viscosity of the resultant resin was: F–I at 60% solids in MAK.

EXAMPLE 11

Preparation of Epoxy and Hydroxy-Functional Acrylic Polymer

A three-liter reaction vessel equipped similarly to that used in Example 1 was charged with 766.35 parts methyl amyl ketone and heated to 260–270° F. A pre-mixture of 455.7 parts styrene, 520.8 parts butyl acrylate, 130.2 parts 2-hydroxyethyl acrylate, 195.3 parts glycidyl methacrylate and 130.27 parts tert-butyl peroxy-3,5,5-trimethylhexanoate was added over 3 hours through a monomer pump. The temperature was held at 260–270° F. throughout the monomer addition. The reaction mixture was then held at 260–270° F. for 1 hour after the monomer addition to allow for completion of the polymerization reaction. At this point, the mixture was cooled, thinned with 101.60 parts of methyl amyl ketone and then filtered. The Gardner Holdt viscosity at the corresponding % solids of the resultant resin was E–F at 60.5% solids and A1 at 50% solids in MAK. The weight average molecular weight was 7000.

EXAMPLE 12

Preparation of Tertiary-Amine and Acid Functional Acrylic Polymer

A five-liter reaction vessel equipped similarly to that used in Example 1 was charged with 1087.66 parts of methyl amyl ketone and heated to 212° F. A pre-mixture of 464.80 parts of methyl methacrylate, 464.8 parts of styrene, 855.93 parts of butyl acrylate, 611.14 parts of N,N-dimethylaminoethyl methacrylate, 49.06 parts of methacrylic acid, 486.90 parts of methyl amyl ketone and 129.6 parts of 2,2'-azobis (2-methylbutyronitrile) was added over 3 hours by an FMI QG50 monomer pump. The temperature was held at 212–222° F. throughout the monomer addition. The reaction mixture was then held at 212–222° F. for 1 hour to allow for completion of the polymerization reaction. A small amount of chaser initiator, 24.28 parts of 2,2'-azobis(2-methylbutyronitrile), was then added and the reaction held for an additional hour at 212–222° F. The reaction mixture was then thinned with 426.50 parts of methyl amyl ketone and filtered. The Gardner Holdt viscosity of the resultant resin was F–I at 55% solids in MAK.

EXAMPLE 13

Preparation of Tertiary-Amine and Acid Functional Acrylic Polymer

A five-liter reaction vessel equipped similarly to that used in Example 1 was charged with 1087.50 parts of methyl amyl ketone and heated to 212° F. A pre-mixture of 741.56 parts of methyl methacrylate, 741.56 parts of styrene, 314.43 parts of butyl acrylate, 587.30 parts of N,N-dimethylaminoethyl methacrylate, 61.27 parts of methacrylic acid, 487.07 parts of methyl amyl ketone and 129.54 parts of 2,2'-azobis(2-methylbutyronitrile) was added over 3 hours via an FMI QG50 monomer pump. The temperature was held at 212–222° F. throughout the monomer addition. The reaction mixture was then held at 212–222° F. for 1 hour following the monomer addition to allow for completion of the polymerization reaction. A small amount of chaser initiator, 23.63 parts of 2,2'-azobis(2-methylbutyronitrile) was then added and the reaction mixture held for an additional hour at 212–222° F. The reaction mixture was then thinned with 426.81 parts of methyl amyl ketone and filtered. The Gardner Holdt viscosity at the corresponding % solids of the resultant resin was: S–U at 55% solids in MAK.

EXAMPLE 14

Preparation of Tertiary-Amine, Carboxy, and Hydroxy-Functional Acrylic Polymer

A five-liter reaction vessel equipped similarly to that used in Example 1 was charged with 1087.50 parts of methyl amyl ketone and heated to 212° F. A pre-mixture of 608.69 parts of methyl methacrylate, 733.84 parts of styrene, 314.43 parts of butyl acrylate, 587.30 parts of N,N-dimethylaminoethyl methacrylate, 51.15 parts of acrylic acid, 150.71 parts of 2-hydroxyethyl methacrylate, 487.07 parts of methyl amyl ketone and 129.54 parts of 2,2'-azobis(2-methylbutyronitrile) was added over 3 hours via an FMI QG50 monomer pump. The temperature was held at 212–222° F. throughout the monomer addition. The reaction mixture was then held at 212–222° F. for 1 hour after the monomer addition to allow for completion of the polymerization reaction. A small amount of chaser initiator, 23.63 parts of 2,2'-azobis(2-methylbutyronitrile) was then added and the reaction mixture was held for an additional hour at 212–222° F. The mixture was then thinned with 427.00 parts of methyl amyl ketone and filtered. The Gardner Holdt viscosity at the corresponding % solids of the resultant resin was: Q–R at 54.3% solids, and H at 50% solids in MAK. The weight average molecular weight was 4800.

EXAMPLE 15

Preparation of Tertiary-Amine Functional Polymer

A five-liter reaction vessel equipped similarly to that used in Example 1 was charged with 1063.70 parts of methyl amyl ketone and heated to 212° F. A pre-mixture of 785.26 parts of methyl methacrylate, 725.33 parts of styrene, 307.55 parts of butyl acrylate, 574.45 parts of N,N-dimethylaminoethyl methacrylate, 476.41 parts of methyl amyl ketone and 126.71 parts of 2,2'-azobis(2-methylbutyronitrile) was added over 3 hours via an FMI QG50 monomer pump. The temperature was held at 212–222° F. throughout the monomer addition. The reaction mixture was then held at 212–222° F. for an additional hour to allow for completion of the polymerization reaction. A small amount of chaser initiator, 23.11 parts of 2,2'-azobis(2-methylbutyronitrile), was then added and the reaction mixture was held for an additional hour at 212–222° F. The mixture was then thinned with 417.48 parts of methyl amyl ketone and filtered. The Gardner Holdt viscosity at the corresponding % solids of the resultant resin was: T–U at 59.8% solids, and C–D at 50% solids in MAK. The weight average molecular weight was 6000.

EXAMPLE 16

Preparation of Tertiary-Amine and Hydroxy-Functional Polymer

A five-liter reaction vessel equipped similarly to that used in Example 1 was charged with 945.51 parts of methyl amyl ketone and heated to 212° F. A pre-mixture of 573.69 parts of methyl methacrylate, 638.03 parts of styrene, 273.38 parts of butyl acrylate, 510.62 parts of N,N-dimethylaminoethyl methacrylate, 131.03 parts of 2-hydroxyethyl methacrylate, 423.48 parts of methyl amyl ketone and 112.62 parts of 2,2'-azobis(2-methylbutyronitrile) was added over 3 hours via an FMI QG50 monomer pump. The temperature was held at 212–222° F. throughout the monomer addition. The reaction mixture was then held at 212–222° F. for an additional hour to allow for completion of the polymerization reaction. A small amount of chaser initiator, 20.54 parts of 2,2'-azobis(2-methylbutyronitrile) was then added and the reaction mixture was held for an additional hour at 212–222° F. The mixture was then thinned with 371.09 parts of methyl amyl ketone and filtered. The Gardner Holdt viscosity at the corresponding % solids of the resultant resin was: J–K at 55.5 % solids, and D at 50% solids in MAK. The weight average molecular weight was 5500.

EXAMPLE 17

Preparation of Acid Functional Polymer

A five-liter reaction vessel equipped similarly to that used in Example 1, with a recycling receiver replacing the Dean-Stark trap was charged with 1164.34 parts of ethyl 3-ethoxypropionate and heated to its reflux temperature of 325° F. A pre-mixture of 707.72 parts of styrene, 1783.17 parts of butyl acrylate, 339.99 parts acrylic acid and 246.16 parts of tert-butyl peroxybenzoate was added over 3 hours via an FMI QG50 monomer pump. The temperature was held at the reflux point of ethyl 3-ethoxypropionate throughout the monomer addition; it was necessary to occasionally remove volatile by-products of the initiator decomposition through the recycling receiver in order to maintain a 320° F. minimum polymerization temperature. The reaction mixture was then held at reflux for an additional hour to allow for completion of the polymerization reaction. The ethyl 3-ethoxypropionate was then removed under vacuum and the resulting resin thinned with 707.72 parts of butyl acetate. The thinned resin solution was then discharged from the reactor and filtered through a 25-micron bag. The Gardner Holdt viscosity at the corresponding % solids of the resultant resin was: Z4 at 80.5% solids, and D-E at 60% solids in n-butyl acetate. The weight average molecular weight was 3800.

EXAMPLE 18

Comparative Example for a Clear Coat System

This is a comparative example where a mixture of tertiary amine, acid, hydroxy- and epoxy functional compounds are used.

| Component A | |
|---|---|
| Resin A (a hydroxy- and epoxy functional resin of Example 9) | 544.33 |
| Component B | |
| Resin B (a tertiary-amine and acid functional resin of Example 13) | 455.67 |
| Total | 1000.00 |

The two Components, A and B, can be mixed together in the weight ratios indicated and applied as a thin clear film. The coatings performance of this example is compared against the coatings performance of the present invention as illustrated in Examples 19–20.

EXAMPLES 19 & 20

Clearcoat Examples

The following two clearcoats were prepared according to the following mixing ratios:

| Example 19: | |
|---|---|
| Component A | |
| Resin A (a hydroxy- and epoxy functional resin of Example 9) | 517.87 |

-continued

| Component B | |
| --- | --- |
| Resin B (a tertiary-amine and acid functional resin of Example 13) | 433.60 |
| Component C | |
| Resin C (an anhydride functional resin of Example 4) | 48.53 |
| Total | 1000.00 |

Example 20:

| Component A | |
| --- | --- |
| Resin A (a hydroxy- and epoxy functional resin of Example 9) | 482.73 |
| Component B | |
| Resin B (a tertiary-amine and acid functional resin of Example 13) | 404.13 |
| Component C | |
| Resin C (an anhydride functional resin of Example 4) | 113.13 |
| Total | 1000.00 |

When ready to use, Components A, B and C are mixed together in the weight ratios indicated.

Films of the Comparative Example (Example 18) and Examples 19 & 20 were prepared by using a three mil (wet film thickness) applicator bar on a glass plate and then baking for 20 minutes at 180F. Film properties were measured 24 hours after application without baking. Such physical properties as hardness, solvent resistance (MEK) and fingerprint resistance were measured. The film properties are compared in Table 1.

TABLE 1

Clear Coatings Properties of Baked and Ambient Cure Enamels.

| | Example 18 Comparative Example | Example 19 | Example 20 |
| --- | --- | --- | --- |
| Properties after baking 20 minutes at 180° F. | | | |
| Fingerprinting out of oven | Prints | No printing | No Printing |
| Konig hardness | 107 | 120 | 134 |
| 50 double MEK rubs, relative effect* | 3 | 5 | 7 |
| Double MEK rubs to break film to substrate | 50 | 100 | 200 |
| Properties after Air Drying (24 hours) | | | |
| Konig Pendulum hardness | 47 | 51 | 64 |
| Dry Times (ASTM D1640): | | | |
| Set to Touch | <5 minutes | <5 minutes | <5 minutes |
| Dust free | 10 minutes | 10 minutes | 10 minutes |
| Dry hard | 8 hours | 6 hours | 2½ hours |

*10 = no effect, 0 = complete dissolving

The data of Table 1 clearly indicate the superiority of the present invention (Examples 19 & 20) over the comparative example (Example 18) where drying, hardness and solvent resistance were superior for both ambient or baked clearcoat applications.

Example 21

Comparative Example for a 2K White Pigmented Enamel

This is a comparative example where a mixture of tertiary amine, acid, hydroxy—and epoxy functional compounds are used in a pigmented single stage enamel formulation.

Several commercially available products are used in this example:

| Product | Source | Function | Description |
| --- | --- | --- | --- |
| Byk Anti-terra 203 | BYK-Chemie | Pigment wetting agent | Alkylammonium salt of a polycarboxylic acid |
| Byk 066 | BYK-Chemie | Defoamer | Polysiloxane |
| Kronos 2310 | Kronos | Hiding pigment | Titanium Dioxide |
| Blanc fixe micro | Sachleben | Inert filler pigment | Barium Sulphate |
| Byk 331 | BYK-Chemie | Surfactant | Polyether modified polydimethylsiloxane |
| Byk 358 | BYK-Chemie | Surfactant | Acrylic copolymer |
| Tinuvin 123 | Ciba | Light stabilizer | Hindered amine CAS No. 129757-67-1 |

| Component A: | |
| --- | --- |
| Resin A (a hydroxyl and epoxy functional resin of Example 9) | 264.04 |
| Byk Antiterra 203 | 0.51 |
| Byk 066 | 0.80 |
| Kronos 2310 | 268.42 |
| Blanc fixe micro | 151.47 |
| The above mixture was dispersed in a High Speed Disperser to 6.5–7.0 Hegman Gauge fineness to which was added: | |
| Byk 331 | 0.85 |
| Byk 358 | 1.13 |
| Tinuvin 123 | 2.76 |
| Component B: | |
| Resin B (a tertiary-amine and acid functional resin of Example 13) | 217.39 |
| Methyl amyl Ketone | 92.63 |
| Total | 1000.00 |

The two Components, A and B, can be mixed together in the weight ratios indicated and applied as a pigmented white film. The coatings performance of this example was compared against the coatings performance of the present invention as illustrated in Examples 22–23.

EXAMPLES 22 & 23

Pigmented Single Stage Enamels

The same commercial products described in example 21 are used in the following white single stage enamels. These examples were prepared according to the present invention using the following mixing ratios:

EXAMPLE 22

Example 22:

Component A

| | |
|---|---:|
| Resin A (a hydroxy- and epoxy functional resin of Example 9) | 190.88 |
| Byk Antiterra 203 | 0.51 |
| Byk 066 | 0.77 |
| Kronos 2310 | 267.85 |
| Blanc fixe micro | 151.15 |

The above mixture was dispersed in a High Speed Disperser to 6.5–7.0 Hegman Gauge fineness to which was added:

| | |
|---|---:|
| Byk 331 | 0.82 |
| Byk 358 | 1.08 |
| Tinuvin 123 | 2.68 |
| Methyl amyl Ketone | 9.14 |

Component B

| | |
|---|---:|
| Resin B (a tertiary-amine and acid functional resin of Example 13) | 248.72 |
| Methyl amyl Ketone | 5.60 |

Component C

| | |
|---|---:|
| Resin C (an anhydride functional resin of Example 4) | 40.80 |
| Total | 1000.00 |

When ready to use, Components A, B and C are mixed together in the weight ratios indicated.

Example 23:

Component A

| | |
|---|---:|
| Resin A (a hydroxy- and epoxy functional resin of Example 9) | 184.05 |
| Byk Antiterra 203 | 0.51 |
| Byk 066 | 0.78 |
| Kronos 2310 | 267.94 |
| Blanc fixe micro | 151.21 |

The above mixture was dispersed in a High Speed Disperser to 6.5–7.0 Hegman Gage fineness to which was added:

| | |
|---|---:|
| Byk 331 | 0.79 |
| Byk 358 | 1.05 |
| Tinuvin 123 | 2.59 |
| Methyl amyl Ketone | 28.10 |

Component B

| | |
|---|---:|
| Resin B (a tertiary-amine and acid functional resin of Example 13) | 239.82 |
| Methyl amyl Ketone | 66.96 |

Component C

| | |
|---|---:|
| Resin C (an anhydride functional resin of Example 4) | 56.20 |
| Total | 1000.00 |

When ready to use, Components A, B and C can be mixed together in the weight ratios indicated above to give white single stage coatings with a volatile organic content (VOC) of 3.5 lbs./gal. and % solids of 70%.

A three-mil applicator bar was used to apply films to a glass plate. Selected early coatings properties were measured and compared against Comparative Example 21 as the control.

TABLE 2

Film properties of pigmented (white) enamels.

| | Example 21 Comparative Example | Example 22 | Example 23 |
|---|---|---|---|
| % Solids | 70 | 70 | 70 |
| VOC, (lbs./gal) | 3.5 | 3.5 | 3.5 |
| Dry Times (ASTM D1640): | | | |
| Set to Touch | 6 minutes | 6 minutes | 5 minutes |
| Dust free | 9 minutes | 8 minutes | 7 minutes |
| Dry hard | 8 hours | 3½ hours | 2 hours |
| Dry Through | 9 hours | 4 hours | 3 hours |
| Properties after 24 hours: | | | |
| Konig Pendulum Hardness | 35 | 42 | 53 |

The data of Table 2 clearly illustrate the superiority of the present invention (Examples 22 & 23) over Comparative Example 21 where drying and hardness are superior for pigmented single stage applications.

EXAMPLES 24–29

Clearcoat Enamel Formulations Utilizing Blends of Monomeric and Polymeric Anhydride Examples 24–28 have the following identical % mole ratio of functionalities: Epoxy/Amine/Hydroxyl/Carboxyl/Anhydride: 45/32/10/0/13 mole % (or 1.4/1.0/0.31/0/0.41 mole ratio). However, the anhydride type has been changed from 100% monomeric to 100% polymeric and mixtures of the two resins. Example 29 is a comparative example without anhydride.

The clear coatings systems of Example 24–29 were applied over cold roll steel test panels as thin films using No. 40 Myer bar applicator. Panels were baked for 20 minutes at 180° F. and evaluated for film properties. Air dried panels were evaluated after 24 hours drying. The performance of various compositions of anhydride (monomeric/polymeric) compared to existing technology can be seen in Table 3.

| | | | Examples: 24–29 | | | |
|---|---|---|---|---|---|---|
| Example No. Coatings Component/ | Example 24 | Example 25 | Example 26 | Example 27 | Example 28 | Comparative Example 29 |
| Mole % of Polymeric Anhydride (Example 2) | 100% | 75% | 50% | 25% | 0% | None |
| Mole % of Monomeric Anhydride (see footnote)** | 0% | 25% | 50% | 75% | 100% | None |
| Weight of Epoxy/Hydroxyl Resin from (Example 9) | 469.59 | 473.47 | 477.34 | 481.22 | 485.09 | 501.42 |
| Tertiary-Amine Resin from (Example 15) | 357.50 | 360.41 | 363.33 | 366.25 | 369.16 | None |
| Tertiary-Amine Resin from (Example 13) | None | None | None | None | None | 452.98 |
| Weight of Polymeric Anhydride Resin (Example 2) | 91.68 | 68.76 | 45.84 | 22.92 | None | None |
| Weight of Monomeric Anhydride (see footnote)** | None | 9.54 | 19.09 | 28.63 | 38.17 | None |
| Xylene | 81.23 | 101.00 | 87.82 | 94.40 | 107.58 | 45.59 |
| Total | 1000 | 1000 | 1000 | 1000 | 1000 | 1000 |

**Dodecenyl succinic anhydride available form from Lubrizol: It is believed to be synthesized by the ene-reaction of maleic anhydride and dodecene.

TABLE 3

Performance of formulations containing monomeric and polymeric anhydride Compounds

| Example Number/ Property | Example 24 | Example 25 | Example 26 | Example 27 | Example 28 | Comparative Example 29 |
|---|---|---|---|---|---|---|
| Viscosity of sample, cps | 325 | 269 | 233 | 194 | 167 | 306 |
| Panels baked 20 minutes at 180 F. | | | | | | |
| Konig hardness | 139 | 142 | 142 | 145 | 151 | 118 |
| MEK, resistance (5 = severe effect, 0 = no effect) | 2 | 3 | 4 | 4–5 | 5 | 5 |
| Panels air dried for 24 hours | | | | | | |
| Konig hardness | 75 | 74 | 82 | 81 | 86 | 66 |
| MEK, resistance (5 = severe effect, 0 = no effect) | 5 | 5 | 5 | 3 | 2 | 5 |

The data of Table 3 clearly illustrate the superiority of the present invention (Examples 24–28) over Comparative Example 29 where VOC or viscosities are lower, hardness and solvent resistance are improved over the present art.

EXAMPLES 30–31

Clearcoat Enamel Formulations

These examples comparative Example 30 where a mixture of epoxy, hudroxyl, and anhydride functional polymers are catalyzed by catalytic amount of a tertiary-amine catalyst (Benzyldimethylamine-0.5% on total solids) to the present invention (Example 31) utilizing a tertiary-amine functional polymer as a co-reactant.

Several commercially available products are used in this example:

| Product | Source | Functionality | Comments |
| --- | --- | --- | --- |
| Setalux 27-1435 | Akzo Nobel Resins | Epoxy | Similar to Example 9 |
| ERL-4221 | Dow Chemical | Epoxy | 3,4-Epoxycyclohexyl-methyl 3,4-Epoxy-cyclo-hexane-carboxylate |
| Setal 26-1688 | Akzo Nobel Resins | Hydroxyl | Polyester polyol |

The following clearcoat formulations were prepared:

|  | Example 30 Comparative | | Example 31 Present Invention | |
| --- | --- | --- | --- | --- |
|  | Weight (g) | Mole % | Weight (g) | Mole % |
| Component A: | | | | |
| Setalux 27-1435 | 106.7 | 25.0% | 80.0 | 21.4% |
| ERL-4221 | 20.6 | 25.0% | 15.4 | 21.4% |
| Setal 26-1688 | 74.1 | 25.0% | 55.5 | 21.4% |
| Xylene | 73.0 | | 48.9 | |
| Component B: | | | | |
| Resin B (tertiary amine-functional polymer, Example 15) | None | | 87.7 | 14.3% |
| Catalyst: Benzyldimethylamine | 1.1 (0.5% on solids) | | None | |
| Component C: | | | | |
| Resin C (anhydride-functional polymer, Example 2) | 99.0 | 25.0% | 74.2 | 21.4% |
| Total: | 374.5 | 100% | 361.7 | 100% |

When ready to use, Components A, B and C can be mixed together in the weight ratios indicated.

When ready to use, Components A, B and C can be mixed together in the weight radios indicated.

Test panels were prepared by drawing down the formulations with a No. 45 Myer bar applicator on 16 gauge steel panels. This results in a dry film thickness of about 1.0–1.2 mils. MEK double-rubs and Konig Pendulum Hardness were determined. The superiority of the present invention (Example 31) over comparative Example 30 is demonstrated by improvements in MEK resistance and better hardness values shown in Table 4.

TABLE 4

Properties of Examples 30–31.

|  | Example 30 Comparative | Example 31 Present Invention |
| --- | --- | --- |
| MEK double-rubs after: | | |
| 20 min. @ 180 F. | 3 | 7 |
| 20 min. @ 300 F. | 31 | 70 |
| Konig Pendulum Hardness after: | | |
| 20 min. @ 180 F. | 3 (tacky) | 50 |
| 20 min. @ 300 F. | 62 | 146 |

EXAMPLE 32

Preparation of Tertiary-Amine and Carboxy Functional Acrylic Polymer

A five-liter reaction vessel equipped similarly to that used in Example 1 was charged with 1063.70 parts of methyl amyl ketone and heated to 212° F. A pre-mixture of 773.30 parts of methyl methacrylate, 725.33 parts of styrene, 307.55 parts of butyl acrylate, 574.45 parts of N,N-dimethylaminoethyl methacrylate, 11.96 parts of methacrylic acid, 476.41 parts of methyl amyl ketone and 126.71 parts of 2,2'-azobis(2-methylbutyronitrile) was added over 3 hours via an FMI QG50 monomer pump. The temperature was held at 212–222° F throughout the monomer addition. The reaction mixture was then held at 212–222° F. for 1 hour after the monomer addition to allow for completion of the polymerization reaction. A small amount of chaser initiator, 23.11 parts of 2,2'-azobis(2-methylbutyronitrile) was then added and the reaction mixture was held for an additional hour at 212–222° F. The mixture was then thinned with 417.48 parts of methyl amyl ketone and filtered. The Gardner Holdt viscosity at the corresponding % solids of the resultant resin was L at 55.5% solids and A1–A at 45% solids in MAK. The weight average molecular weight was 4614.

EXAMPLE 33

Preparation of Anhydride-Functional, Water-Dispersible Acrylic Polymer

A three-liter reaction vessel equipped similarly to that used in Example 1 was charged with 450.24 parts methyl amyl ketone and heated to its reflux temperature of 306° F. A pre-mixture composed of 290.75 parts of butyl methacrylate, 290.75 parts of styrene, 290.75 parts of maleic anhydride, 581.50 parts of butyl acrylate, 115.36 parts of methoxy(polyethyleneglycol) methacrylate (average MW: 430), 280.00 parts of methyl amyl ketone and 52.42 parts of ethyl 3,3-di-(t-amylperoxy)-butyrate was prepared. The pre-mixture was then divided into two portions of 1369.02 parts and 532.52 parts, labeled Pre-mix A and Pre-mix B respectively. The composition of Pre-mix B was further modified by the addition of 21.00 parts of acrylic acid and 100.80 parts of 2-acrylamido-2-methyl propanesulfonic acid. Pre-mix A was added to the reaction vessel over 215 minutes and was followed by a 15-minute hold period at reflux. Following the hold period, Pre-mix B was added to the reaction vessel over 90 minutes. The temperature was held at the reflux point of methyl amyl ketone throughout both pre-mixture additions and for the 30 minutes following the Pre-mix B addition. A small amount of chaser initiator, 2.77 parts of ethyl 3,3-di-(t-amylperoxy)-butyrate, was then added and the reaction mixture was held at reflux for an additional hour to complete the polymerization. The reaction mixture was then cooled and thinned with 162.4 parts of methyl amyl ketone. The thinned resin solution was discharged and filtered. The resultant resin percent solids was 64.2% and the resin viscosity was 1400 centipoise as measured by a Brookfield LV viscometer with spindle #3 at 30 rpm. The weight average molecular weight was 6200.

To disperse the resin in water, 60.0 parts of triethylamine and 624.0 parts of de-ionized water were charged to a 1-gallon metal container suspended beneath a Premier Dispersator. The dispersator was set to 2000 rpm and 1538 parts of the resin were added to the amine/water mixture over 5 minutes. The dispersator speed was increased to 7000 rpm over the addition time as the level rose in the dispersion vessel, and that speed was held for 5 additional minutes following the resin addition to promote a stable dispersion. The resultant dispersion percent solids was 45.6% and the viscosity was 2400 centipoise as measured by a Brookfield LV viscometer with spindle #3 at 30 rpm. The pH of the dispersion was 4.4 and the particle size as measured by a Brookhaven 90 Plus light-scattering instrument was 618 nm.

EXAMPLE 34

Preparation of Waterborne Epoxy and Hydroxy-Functional Acrylic Polymer

A reactor was charged with the following ingredients: 323.1 g of deionized water, 8.21 g of Igepal®CO-897 (nonylphenol polyethylene oxide with 40 moles of ethylene oxide, ex Rhodia) and 12.52 grams of Trigonox®AW-70 (70% aqueous solution of tert-butyl hydroperoxide, ex Akzo Nobel). The reactor was heated to 65° C. under a nitrogen blanket. At 65° C. a mixture of 8.5 g of styrene and 10.6 g of butyl acrylate was added to the reactor. Subsequently, a solution of 0.3 g of sodium formaldehyde sulfoxylate in 8.3 g of water was added to the reactor. In the meantime a monomer pre-emulsion was prepared in a separate container using the following ingredients in grams.

| | |
|---|---|
| Deinonized water | 400.6 |
| Igepal - CO-897 | 41.8 |
| Poly(vinylpyrrolidon) (molecular weight 30000) | 4.4 |
| Styrene | 312.4 |
| hydroxyethyl methacrylate | 70.3 |
| butyl acrylate | 243.8 |
| glycidyl methacrylate | 215.2 |
| 2-mercaptoethanol | 18.4 |

This pre-emulsion was added to the reactor over a period of 3 h. Simultaneously, the addition of a solution of 4.3 g of sodium formaldehyde sulfoxylate in 131.1 g of water was started. The addition of this mixture was completed in 4 h. After the additions were completed, the batch was kept at 65° C. for an additional 15 min. The batch was then cooled to room temperature (R.T.) and filtered. The polymer dispersion thus obtained had the following properties: solids content 50.0%, particle size 165 nm, pH 8.6. Size exclusion analysis on the polymer gave the following results: Mn 2,661; Mw 6730 (relative to polystyrene standards).

EXAMPLES 35–36

Pigmented Single Stage Waterborne Enamel

These examples compare comparative Example 35, using a waterborne mixture of epoxy, hydroxyl, and tertiary-amine functional polymers, to the present invention (Example 36). Example 36 contains the same waterborne mixture of epoxy, hydroxy-, and tertiary-amine functional polymers utilized in Example 35 plus the addition of an anhydride-functional polymer (Example 33) as a co-reactant. Several commercially available products are used in these examples:

| Product | Source | Function | Description |
|---|---|---|---|
| Setal 6407 SQ-26 | Akzo Nobel Resins | Hydroxy-functional resin | Waterborne Polyester polyol |
| Setalux 8552 AQ-50 | Akzo Nobel Resins | Epoxy-functional resin | Waterborne polymer similar to Example 9 |
| Setalux 8455 AQ-36 | Akzo Nobel Resins | Tertiary-amine functional resin | Waterborne polymer similar to Example 13 |
| Drewplus L-475 | Drew International | Defoamer | Blend of mineral oils and silica derivatives |
| Kronos 2310 | Kronos | Hiding pigment | Titanium Dioxide |
| Borchigel L75 N | Schoner | Thickener | Polyurethane-based associative thickening agent |
| Butyl Cellosolve | Union Carbide | Solvent | Ethylene glycol butyl ether |
| Eastman TXIB | Eastman Chemicals | Plasticizer | TMPD Diisobutyrate |
| TEGO Glide 410 | Tego Chemie | Anti-mar agent | Polysiloxane-polyether copolymer |
| CAB-O-SPERSE CT302C | Cabot | Water repellent | Aqueous dispersion of colloidal silica |
| TAFIGEL PUR 60 | Munzing Chemie | Thickener | Polyurethane-based associative thickening agent |

The following white single-stage formulations were prepared:

| | Example 35 Comparative | | Example 36 Present Invention | |
|---|---|---|---|---|
| Component | Weight (g) | Mole % | Weight (g) | Mole % |
| Component A: Mix under agitation: | | | | |
| Setal 6407 SQ-26 | 98.31 | 9.1% | 98.31 | 7.4% |
| Drewplus L-475 | 0.31 | | 0.31 | |
| D.I. Water | 14.72 | | 14.72 | |
| Kronos 2310 | 173.74 | | 173.74 | |
| Borchigel L75 N | 2.35 | | 2.35 | |
| Disperse to 7–7.5 Hegman Add under slow agitation to the pre-mixed clear base Premix the clear base: | | | | |
| Setalux 8455 AQ-36 | 297.39 | 38.0% | 297.39 | 30.9% |
| Eastman TXIB | 4.80 | | 4.80 | |
| TEGO Glide 410 (50% in butyl Cellosolve) | 1.84 | | 1.84 | |
| CAB-O-SPERSE CT302C | 49.87 | | 49.87 | |

-continued

| Component | Example 35 Comparative Weight (g) | Mole % | Example 36 Present Invention Weight (g) | Mole % |
|---|---|---|---|---|
| TAFIGEL PUR 60 (10% in DI water/butyl Cellosolve, 75:25) | 11.75 | | 11.75 | |
| D.I. Water | 60.81 | | 60.81 | |
| Component B: | | | | |
| Setalux 8552 AQ-50 | 284.11 | 52.9% | 284.11 | 42.9% |
| Component C: | | | | |
| Resin C (a waterborne anhydride-functional polymer of Example 33) | — | — | 114.91 | 18.8% |
| D.I. Water | — | — | 22.98 | |
| Methyl amyl ketone | — | — | 11.49 | |
| Total: | 1000.00 | 100% | 1149.38 | 100% |

When ready to use, Components A, B and C can be mixed together in the weight ratios indicated.

Test panels were prepared by drawing down the formulations with a No. 34 Myer bar applicator on 0.025 aluminum panels. This results in a dry film thickness of about 0.8–0.85 mils. MEK double-rubs and Konig Pendulum Hardness were determined.

The superiority of the present invention is demonstrated by improvements in MEK resistance and better Konig hardness values shown in Table 5.

TABLE 5

Properties of Examples 35–36

| | Example 35 Comparative | Example 36 Present Invention |
|---|---|---|
| MEK double-rubs after: | | |
| 20 min. @ 225 F., after cool-down | 28 | 56 |
| plus 1 day RT* | 58 | 90 |
| 20 min. @ 250 F., after cooldown | 60 | 164 |
| Konig Pendulum Hardness after: | | |
| 20 min. @ 225 F., after cool-down | 132 | 149 |
| plus 1 day RT | 148 | 161 |
| 20 min. @ 250 F., after cool-down | 147 | 166 |

*RT = Room Temperature, ambient conditions.

The above results clearly demonstrate the outstanding solvent resistance and hardness development of the present invention (example 36) in comparison with comparative example 35.

EXAMPLES 37–38

Clearcoat Enamel Formulations

These examples compare comparative Example 37 where a mixture of epoxy, hydroxyl, and anhydride functional compounds are catalyzed by a small amount of a tertiary-amine catalyst (Benzyldimethylamine—0.5% on total solids) to the present invention (Example 38) utilizing a tertiary-amine functional polymer as a co-reactant. Several commercially available products are used in this example:

| Product | Source | Functionality | Comments |
|---|---|---|---|
| ERL-4221 | Dow Chemical | Epoxy | 3,4-Epoxycyclohexyl-methyl 3,4-Epoxy-cyclo-hexane-carboxylate |
| Setal 26-1688 | Akzo Nobel Resins | Hydroxyl | Polyester polyol |

The following clearcoat formulations were prepared:

| Component | Example 37 Comparative Weight (g) | Mole % | Example 38 Present Invention Weight (g) | Mole % |
|---|---|---|---|---|
| Component A: | | | | |
| ERL-4221 | 41.2 | 42.8% | 41.1 | 42.6% |
| Setal 26-1688 | 98.8 | 28.6% | 98.8 | 28.4% |
| Xylene | 60.4 | | 60.0 | |
| Component B: | | | | |
| Resin B (tertiary amine-functional polymer, Example 32) | None | | 4.7 | 0.6% |
| Catalyst: Benzyldimethylamine | 0.96 (0.5% on solids) | | None | |
| Component C: | | | | |
| Resin C (anhydride-functional polymer, Example 4) | 143.4 | 28.6% | 143.3 | 28.4% |
| Total: | 344.76 | 100% | 347.9 | 100% |

When ready to use, Components A, B and C can be mixed together in the weight ratios indicated.

Test panels were prepared by drawing down the formulations with a No. 40 Myer bar applicator on 16 gauge steel panels. This results in a dry film thickness of about 1.0–1.2 mils. MEK double-rubs and Konig Pendulum Hardness were determined.

The superiority of the present invention is demonstrated by improvements in MEK resistance and better hardness values shown in Table 6.

TABLE 6

Properties of Examples 37–38.

| | Example 37 Comparative | Example 38 Present Invention |
|---|---|---|
| MEK double-rubs after: | | |
| 20 min. @ 300 F. | 17 | 90 |
| Konig Pendulum Hardness after: | | |
| 20 min. @ 300 F. | 70 | 125 |

The invention is further illustrated by the following claims, which, however, do not limit the scope thereof.

What is claimed is:

1. A reactive non-isocyanate coating composition prepared by mixing epoxy, tertiary amine, anhydride, hydroxy- and acid functional compounds, the tertiary amine functional compound being an oligomeric or polymeric tertiary amine with or without other functional groups and wherein:

i. an acid functional compound and the tertiary amine functional compound are combined in a first polymer including tertiary amine and acid functional groups;
ii. the anhydride functional compound constitutes a second polymer and comprises a polymeric cyclic anhydride having two or more anhydride groups per molecule; and
iii. the epoxy and hydroxy-functional compounds are combined in a third polymer including epoxy and hydroxy-functional groups.

2. The composition of claim 1, wherein the tertiary amine functional compound is an oligomeric or polymeric tertiary amine having two or more tertiary amine groups per molecule.

3. The composition of claim 1, wherein the epoxy functional compound is an oligomeric or polymeric epoxy having two or more epoxy-functional groups per molecule.

4. The composition of claim 1, wherein the tertiary amine functional compound is polymeric.

5. The composition of claim 1, wherein the composition is a waterborne composition.

6. The composition of claim 1, wherein the composition is a solvent-borne composition.

7. The composition of claim 1, wherein the tertiary amine functional compound is an acrylic copolymer based on dimethylaminoethyl methacrylate.

8. The composition of claim 1, wherein the anhydride functional compound is a polymeric cyclic diacid anhydride.

9. The composition of claim 1, wherein the anhydride functional compound is a copolymer of maleic anhydride, styrene and acrylic monomers.

10. The composition of claim 1, wherein the epoxy functional compound is an acrylic copolymer containing glycidyl methacrylate.

11. The composition of claim 1, wherein anhydride functional groups of the anhydride functional compound react with hydroxy-functional groups of the hydroxy-functional compound, and tertiary amine functional groups of the tertiary amine functional compound react with epoxy functional groups of the epoxy functional compound.

12. A substrate coated with the coating composition of claim 1.

13. A coating system having at least three components which are combined to make a coating composition, said components being: i) a first polymer including tertiary amine and acid functional groups obtained by combining an acid functional compound and an oligomeric or polymeric tertiary amine functional compound: ii) a second polymer comprised of polymeric cyclic anhydride having two or more anhydride groups per molecule: and, iii) a third polymer including epoxy and hydroxy-functional groups and obtained by combining oligomeric or polymeric epoxy functional compounds and hydroxy-functional compounds.

14. The coating system of claim 13, wherein the coating composition is a waterborne composition.

15. The coating system of claim 13, wherein the coating composition is a solvent-borne composition.

16. The coating system of claim 13, wherein the tertiary amine functional compound is an acrylic copolymer based on dimethylaminoethyl methacrylate.

17. The coating system of claim 13, wherein the polymeric cyclic anhydride is a copolymer of maleic anhydride, styrene and acrylic monomers.

18. The coating system of claim 13, wherein the epoxy functional compound is an acrylic copolymer containing glycidyl methacrylate.

19. A substrate coated with the coating composition made from the coating system of claim 13.

* * * * *